US012682188B2

(12) United States Patent
Elwin et al.

(10) Patent No.: US 12,682,188 B2
(45) Date of Patent: Jul. 14, 2026

(54) SKIMMING AND MAGNETIC READ PREVENTION

(71) Applicant: NCR Atleos Corporation, Atlanta, GA (US)

(72) Inventors: Dave Peter George Elwin, Dundee (GB); Charles Harrow, Dundee (GB); Alexander William Whytock, Perthshire (GB)

(73) Assignee: NCR Atleos Corporation, Atlanta, GA (US)

( * ) Notice: Subject to any disclaimer, the term of this patent is extended or adjusted under 35 U.S.C. 154(b) by 0 days.

(21) Appl. No.: 18/590,152

(22) Filed: Feb. 28, 2024

(65) Prior Publication Data

US 2024/0281624 A1    Aug. 22, 2024

Related U.S. Application Data

(63) Continuation of application No. 17/899,872, filed on Aug. 31, 2022, now Pat. No. 11,977,945.

(51) Int. Cl.
*G06K 7/08* (2006.01)

(52) U.S. Cl.
CPC .................................. *G06K 7/087* (2013.01)

(58) Field of Classification Search
CPC ...... G06K 7/087; G06K 7/0013; G06K 7/084; G06K 7/0004; G06K 7/0091; G06K 7/0026
USPC ....................................................... 235/449
See application file for complete search history.

(56) References Cited

U.S. PATENT DOCUMENTS

| | | | |
|---|---|---|---|
| 2013/0299586 A1 | 11/2013 | Yesil et al. | |
| 2016/0191197 A1* | 6/2016 | Ray ........................ | G06K 7/087 |
| | | | 235/435 |
| 2024/0039654 A1* | 2/2024 | Johnston ............... | G07F 7/0873 |

FOREIGN PATENT DOCUMENTS

| | | | | |
|---|---|---|---|---|
| DE | 112015002115 T5 | 3/2017 | | |
| EP | 2308007 B1 | 9/2014 | | |
| KR | 20190026446 A | * 3/2019 | ........... | G07F 19/209 |

OTHER PUBLICATIONS

English translation of KR20190026446A from Espacenet (Year: 2019).*

"U.S. Appl. No. 17/899,872, Non Final Office Action mailed Aug. 29, 2023", 7 pgs.

(Continued)

*Primary Examiner* — Matthew Mikels

(74) *Attorney, Agent, or Firm* — Schwegman Lundberg & Woessner, P.A.

(57) ABSTRACT

A card reader prevents a magnetic read head of the card reader from being able to read a magnetic strip of a card and forces the card reader to read card data from an embedded chip of the card instead of the magnetic strip. An electromagnetic noise interference signal is generated and is maintained within the card reader. The signal prevents a magnetic read head of the card reader and any skimmer present within the card reader from reading the magnetic strip of the card. In an embodiment, the signal is generated and maintained as long as the card reader is powered on. In an embodiment, the signal is generated when at least one sensor of the card reader detects a presence of the card proximate to a card slot of the card reader, within the card slot, or within the card reader adjacent to the magnetic read head.

20 Claims, 4 Drawing Sheets

(56)        References Cited

OTHER PUBLICATIONS

"U.S. Appl. No. 17/899,872, Notice of Allowance mailed Jan. 8, 2024", 8 pgs.

"U.S. Appl. No. 17/899,872, Response filed Nov. 29, 2023 to Non Final Office Action mailed Aug. 29, 2023", 8 pgs.

"European Application Serial No. 22216215.8, Extended European Search Report mailed Aug. 16, 2023", 11 pgs.

U.S. Appl. No. 17/899,872, filed Aug. 31, 2022, Skimming and Magnetic Read Prevention.

* cited by examiner

200

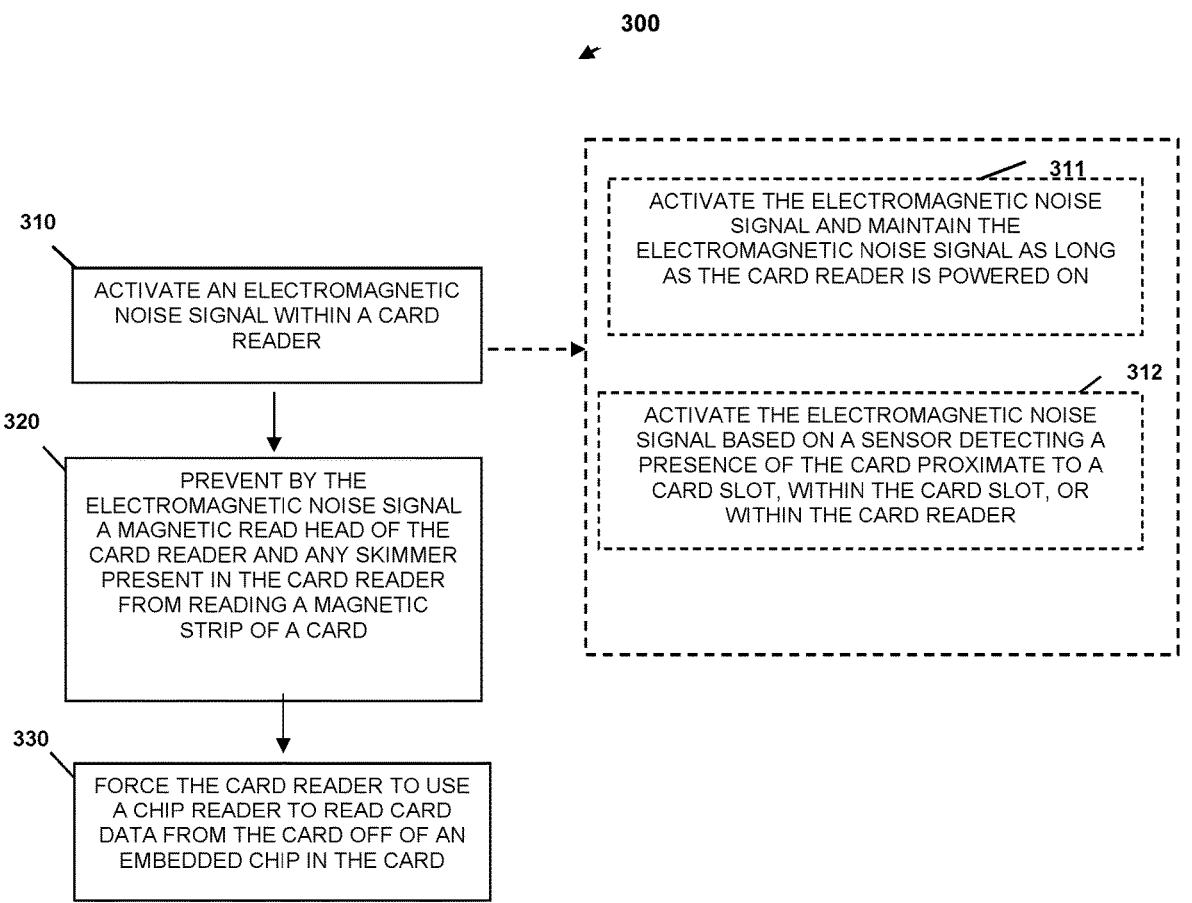

300

310

ACTIVATE AN ELECTROMAGNETIC NOISE SIGNAL WITHIN A CARD READER

311

ACTIVATE THE ELECTROMAGNETIC NOISE SIGNAL AND MAINTAIN THE ELECTROMAGNETIC NOISE SIGNAL AS LONG AS THE CARD READER IS POWERED ON

312

ACTIVATE THE ELECTROMAGNETIC NOISE SIGNAL BASED ON A SENSOR DETECTING A PRESENCE OF THE CARD PROXIMATE TO A CARD SLOT, WITHIN THE CARD SLOT, OR WITHIN THE CARD READER

320

PREVENT BY THE ELECTROMAGNETIC NOISE SIGNAL A MAGNETIC READ HEAD OF THE CARD READER AND ANY SKIMMER PRESENT IN THE CARD READER FROM READING A MAGNETIC STRIP OF A CARD

330

FORCE THE CARD READER TO USE A CHIP READER TO READ CARD DATA FROM THE CARD OFF OF AN EMBEDDED CHIP IN THE CARD

FIG. 3

SKIMMING AND MAGNETIC READ PREVENTION

CROSS-REFERENCE TO RELATED APPLICATION

This application is a continuation of U.S. patent application Ser. No. 17/899,872, filed Aug. 31, 2022, which application and publication is incorporated herein by reference in its entirety.

BACKGROUND

Nearly all jurisdictions across the world have mandated integrated chips on payment cards. Out of convenience and because magnetic strip card reading was not fully phased out, most card chip readers also provide magnetic card readers. This has presented numerous problems in the industry because even when a card chip is read at a terminal, the magnetic strip still passes through the card slot of the reader such that a skimmer inserted into the slot can still steal the magnetically encoded information on the card. Some card issuers have stopped issuing magnetic strip cards but most still do.

A skimmer is an extremely small device with a thickness of a 1-2 millimeters. It is very difficult to detect by an untrained consumer and by staff of an enterprise associated with a transaction terminal. Thieves design the skimmer such that a magnetic read head is positioned in the card path through the card slot so that the magnetic strip on the card will pass over the read head. The skimmer may include a transmitter such that the thieve situated nearby or with a device nearby can wirelessly receive the stolen card data that is transmitted. The skimmer may alternatively include storage such that the thief can return to the card reader and remove the skimmer and obtain the stolen card data stored thereon.

Approaches in the industry have been either to detect an inserted skimmer and shut down the card reader/terminal when detected or to create an electromagnetic interference when a card is detected as entering the card slot but not fully inserted into the card reader. The interference is shut down once the card is fully inserted into the slot, such that should other approaches fail to detect a skimmer, the magnetically encoded card data can still be stolen.

As a result, current approaches have failed to prevent thieves from stealing card data at terminals. A better approach is therefore needed.

SUMMARY

In various embodiments, a card reader, a method of operating a card reader, and a system for a card reader are presented for preventing reading magnetically encoded information on magnetic strips of cards. An electromagnetic noise interference signal is maintained within the card reader when the card reader is powered on. Alternatively, sensors detect when a card is within or near a card slot of the card reader and an electromagnetic noise interference signal is maintained until the card is detected as being removed from the card slot. The interference signal prevents a magnetic read head of the card reader from reading card data from a magnetic strip of the card. The interference signal also prevents any skimmer present within the card reader from reading the magnetic strip. The card reader is forced to read the card data off an embedded chip of the card.

According to an aspect, a card reader is provided that prevents the magnetic read head of the card reader and any skimmer inserted into a card slot of the card reader from reading a magnetic strip of a card. The card reader includes a magnetic card reader, a chip card reader, sensors, a processing, and a non-transitory computer-readable storage medium that includes executable instructions for firmware. The firmware when executed detects a presence of a card using at least one of the sensors; activates an electromagnetic noise signal within the card reader in response to the presence; maintains the electromagnetic noise signal until the card is detected by the sensors of exiting a card slot of the card reader; and Prevents through the maintaining of the signal the magnetic card reader from reading card data for the card off a magnetic strip of the card, prevents through the maintaining of the signal any skimmer present within the card reader from reading the magnetic strip, and forces the chip reader to read the card data off an embedded chip of the card.

BRIEF DESCRIPTION OF THE DRAWINGS

FIG. 3 is a diagram of a method for disabling magnetic card reading by the card reader and by any skimmer present in the card slot of the card reader, according to an example embodiment.

DETAILED DESCRIPTION

As stated above, skimmers are a big problem in the industry. Yet, most card readers rely on chip reading such that magnetic strip reading is unnecessary and poses a security risk to consumers. Current approaches that only prevent magnetic strip reading until the card is fully inserted into the card reader still fail to prevent card data theft when the skimmer goes undetected within the card slot.

The teachings that follow provide a novel inexpensive and effective mechanism to stop card data theft. This is achieved through a card reader with an internally generated or an externally generated electromagnetic interference signal that prevents the card reader any any skimmer, which may be present in the card slot, from reading the magnetically encoded information on the magnetic strip of the card. The card reader is thereby forced to perform a chip read on the embedded chip of the card through its chip reader.

Figure 1A:
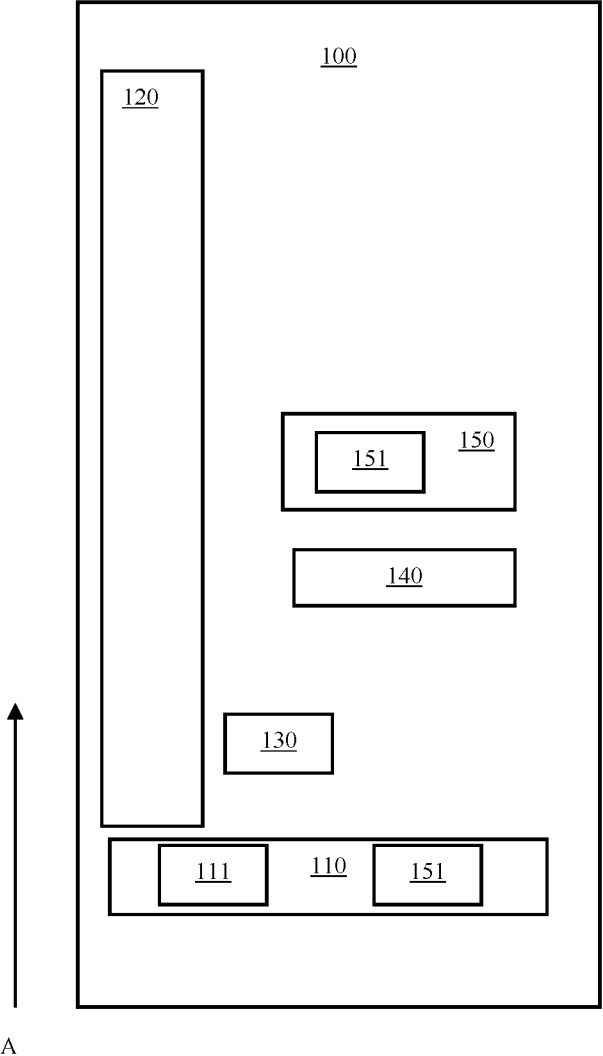
FIG. 1A is a diagram of card reader that disables magnetic strip reading from a card by the card reader and by any skimmer present in the card slot of the card reader, according to an example embodiment.

FIG. 1A is a diagram of card reader that disables magnetic strip reading from a card by the card reader and by any skimmer present in the card slot of the card reader, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or fewer components are possible without departing from the teachings of disabling a card reader's magnetic read head and any skimmer read head, which may be present in the card slot of the card reader as presented herein and below.

Card reader 100 includes a card slot 110 with an optional slot sensor 111, a motorized card transport 120, one or more other optional card sensors 130 (optional), a chip reader or chip read head 140, and a magnetic read head 150 having an optional electromagnetic noise generator 151. It is noted that the arrangement and placement of the components of card reader 100 may vary without departing from the embodiments presented herein and below. The label "A" and the corresponding arrow depicted in FIG. 1A is intended to illustrate the direction of the card through the card slot 110 and into the card reader 100.

Figure 1B:
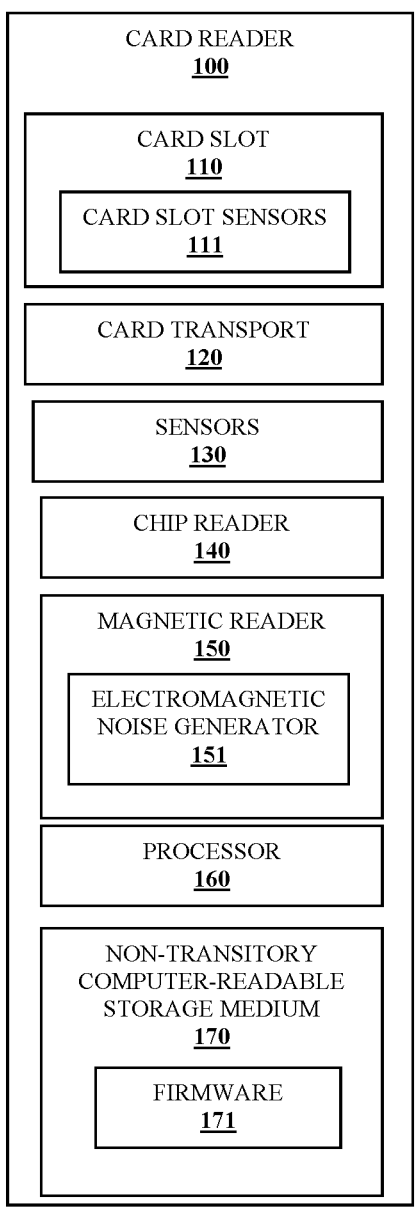
FIG. 1B is another diagram of the card reader of FIG. 1A, according to an example embodiment.

FIG. 1B is another diagram of the card reader 100 of FIG. 1A, according to an example embodiment. As illustrated in FIG. 1B, the card reader 100 further includes at least one processor 160 and firmware executable instructions 171 (just firmware 171 hereinafter).

In an embodiment, slot 110 includes a sensor 111 that detects when a card is inserted, or anything passes into the slot 100. This may or may not include a shutter associated with slot 110 such that when the shutter is opened the sensor 111 is triggered. It may also include an optical sensor 111 that detects the presence of an object entering the slot 110 or a motion sensor 111 that identifies an object before a card is even inserted into the slot 110. The sensor 111 causes an event to be raised within card reader 100. The firmware 171 activates an electromagnetic noise signal generator 151 that is maintained on the magnetic read head 150. This forces the card reader 100 to perform a chip read on the embedded chip of the card using chip reader 140. Generator 151 maintains the noise signal until sensor 111 and/or 130 indicates that the card was removed completely from the reader 100.

In an embodiment, firmware 171 activates an internal or an external electromagnetic noise generator (151 or 212 (shown in FIG. 2)) for as long as the card reader 100 is powered on. That is, the noise signal is maintained as long as the card reader 100 is receiving power. In this embodiment, sensors 130 may or may not be needed within the card reader 100 and any sensors 130 can be used for other purposes besides skimmer detection and prevention.

In an embodiment, electromagnetic noise signal generator 151 is a pulsating coil that is either in contact with the magnetic read head 150 or is adjacent to the magnetic read head. In an embodiment, the electromagnetic noise signal generator 151 may be located behind a bezel of the card slot 111. The pulsating coil creates electromagnetic interference or noise preventing the magnetic read head 150 and any skimmer read head from reading the magnetic strip of a card.

Existing card readers that permit both magnetic card reads and chip reads and that include an electromagnetic noise source may be enhanced by changing its firmware to maintain the noise as long as the card readers are powered on or while the card is detected proximate to the card slot, within the card slot, or within the card reader (the electromagnetic noise is maintained until the card is removed). Conventionally, these existing device turn off the noise when the card is inserted into the card slot so that the magnetic read head can read the card data from the magnetic strip on the card.

Existing card readers within any electromagnetic noise source may be enhanced by adding the electromagnetic noise generator 151 or 212 (shown in FIG. 2), optional sensors 111 and 130, if not already present, and modifying and enhancing the firmware with firmware 171 to maintain the electromagnetic noise on the magnetic reader (read head) 151 as long as the card reader 100 is receiving power or when a card is detected about to enter the slot 110, within the slot 110, within the reader 100, and until the sensors 111 and 130 indicate the card was withdrawn from the slot 110.

The firmware 171 is configured to force and maintain the electromagnetic noise signal using the electromagnetic noise generator 151 as long as the card reader 100 is receiving power or when a card is detected outside of the slot 110 by sensor 111, inside the slot by sensor 111, in the reader 100 by sensors 130. The firmware 171 may deactivate the noise signal when the sensors 111 and 130 indicate that the card was removed from the slot 110 in the case where sensors 111 and 130 are used to activate the noise signal within card reader 100.

Card reader 100 prevents magnetic card reads but this should not be a problem particularly for automated teller machines (ATMs), which for the most part are all equipped with chip reader capabilities. Thus, security of the ATMs are improved with card reader 100 since skimmers will be of little use to thieves attempting to steal customer card data.

Figure 2:
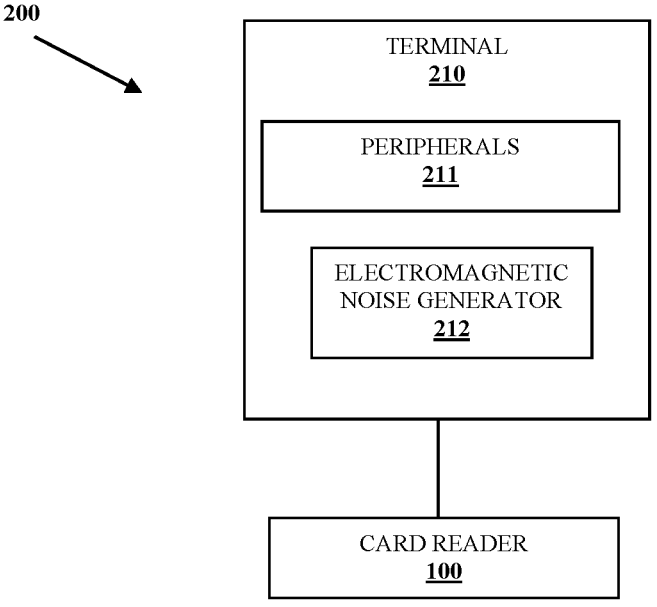
FIG. 2 is a diagram of a system for a card reader that disables magnetic strip reading from a card by the card reader and by any skimmer present in the card slot of the card reader, according to an example embodiment.

FIG. 2 is a diagram of a system 200 for a card reader 100 that disables magnetic strip reading from a card by the card reader 100 and by any skimmer present in the card slot of the card reader 100, according to an example embodiment. The system 200 comprises a terminal 210 having a plurality of internally integrated peripherals 211 and externally interfaced peripherals 211. System 200 at least includes an integrated card reader peripheral 100. Optionally, terminal 210 includes an electromagnetic noise generator 212. Initially, card reader 100 is enabled to read both magnetic strips from cards and card chip information from embedded chips of the cards but as demonstrated below this capability is disabled with system 200.

In an embodiment, the terminal 210 includes other peripherals 211 such as a touch display, a receipt printer, a media depository, a media dispenser, a scanner, a weigh scale, a combined scanner and weigh scale, a bag scale, a keypad, a Personal Identification Number (PIN) pad, an encrypted PIN pad, etc. In an embodiment, the terminal 210 is an ATM, a self-service terminal (SST), a point-of-sale (POS) terminal, a fuel pump kiosk, a travel kiosk, a reservation kiosk, an entertainment kiosk, or an informational kiosk.

During operation of the terminal 210, a customer inserts a card (for example, a credit card, a debit card, a bank card, a loyalty card, a gift card, etc.) into card slot 111 of card reader 100. In an embodiment, firmware 171 of card reader 100 causes or causes activation of a noise signal by electromagnetic noise generator 212 as long as card reader 100 is receiving power, such that the magnetic read head 171 is rendered unusable within card reader 100. In an embodiment, sensors 111 may detect the card before it is actually inserted into the slot 111 through a motion sensor 111 situated in the bezel of the slot 111 and/or sensors may detect the card entering the slot 111 through an optical sensor 111 that is covered by the card as the card enters the slot 111. This detection of the card about to enter the slot 111 and/or within the slot 111 raises an event to firmware 171. Firmware 171 activates the electromagnetic noise generator 151 and maintains the electromagnetic noise on the magnetic reader 151 until the sensors 130 and 111 indicate that the card has been completely withdrawn from the slot 110. Optionally, firmware 171 causes electromagnetic noise generator 212 of terminal 210 to be activated instead of electromagnetic noise generator 151 that is internal to card reader 100. Because the reader 100 is unable to read the magnetic strip of the card when the card was in the reader 100, the reader 100 is forced to use the chip reader 140 to read the card data from the embedded chip in the card. This is a safer operation with less chance of data theft and ensures that any skimmer is unable to read the magnetic strip of the card.

In an embodiment, the electromagnetic noise generator 151 is located within the card reader adjacent to the magnetic read head 150 or is located behind a bezel of and within the card slot 110. In an embodiment, the electromagnetic noise generator 212 is located outside of the card reader 100 completely and is located elsewhere within the terminal 210.

The attempts by thieves to read magnetic strips of cards are thwarted by reader 100. The electromagnetic noise can be continuously maintained was long as reader 100 is receiving power or can be provided before a card enters the slot 110, when the card enters the slot 110, and while the card is detected within the reader 100 or the slot 111, such that the entire duration in which a card is within the slot 111 and reader 100 the noise creates electromagnetic interference and neither a skimmer nor the reader's magnetic read head 150 can read the magnetic strip from the card.

In cases where existing readers are equipped with an electromagnetic noise generator and sensors, reader 100 can be achieved by updating the firmware of the existing readers to firmware 171. In cases where existing readers are not equipped with an electromagnetic noise generator, the electromagnetic noise generator 151 may be added in a variety of configurable locations, such as adjacent to the magnetic reader, behind a bezel of the card slot, or elsewhere that is external to the reader within the terminal 210. Once an electromagnetic noise generator 151 is added, the firmware of the existing readers are upgraded or enhanced with firmware 171. Firmware 171 maintains the electromagnetic noise signals as long as reader 100 is powered on or for the entire length of time that a card is in slot 110 and reader 100 or even at a time that precedes when the card enters the slot (such as through uses of a motion sensor 111 that detects an object outside of the slot and approaching the slot 111).

FIG. 3 is a diagram of a method 300 for disabling magnetic card reading by the card reader 100 and by any skimmer present in the card slot of the card reader 100, according to an example embodiment. The method 300 is implemented as executable instructions referred to herein as "firmware." The firmware is executed by a processor 160 of a card reader 100, which cause the processor 160 to perform operations discussed with method 300. The firmware resided in non-transitory computer-readable storage media 170 or memory 170 of the card reader 100. In an embodiment, the firmware is firmware 171 discussed above with FIGS. 1A, 1B, and 2.

At 310, the firmware activates an electromagnetic noise signal within a card reader. This can be done in a number of manners.

For example, and in an embodiment, at 311, the firmware activates the electromagnetic noise signal and maintains the noise signal as long as card reader 100 is powered on and receiving power. This ensures no magnetic strip reading is possible within the card reader 100 and prevents any skimmer from stealing the corresponding card data.

As another example, and in an embodiment, at 312, the firmware activates an electromagnetic noise signal based on at least one sensor 111 or 130 detecting or reporting a presence of a card proximate to slot 110, within slot 110, or within reader 100. The noise signal is maintained as long as at least one sensor 111 or 130 is reporting a presence of the card within reader 100 or proximate to slot 111.

The noise signal can be generated by an internal electromagnetic noise generator 151 controlled by the firmware, the generator 151 can be internal to the card reader 100 located behind a bezel of the slot 111 or adjacent to magnetic reader 150.

In another embodiment, the firmware causes activation of an electromagnetic noise generator 212 located within a terminal 210 associated with the card reader 100. The firmware may issue an Application Programming Interface (API) call, or an instruction directed to the electromagnetic noise generator 212 causing the electromagnetic noise signal to be generated.

At 320, the firmware prevents, by the electromagnetic noise signal, a magnetic read head 150 of the card reader 100 and any skimmer present in the card reader 100 from reading a magnetic strip of the card. Again, the signal can be maintained as long as reader 100 is receiving power or based on events reported by optional sensors 111 and/or 130 to determine when the card is no longer within the card reader such that the electromagnetic noise signal can be deactivated.

At 330, the firmware forces the card reader 100 to use a chip reader 140 to read card data from the card off of an embedded chip in the card. That is, the reader 100 is only able to read the card data from its chip reader 140 and is unable to read the card data off the magnetic strip of the card through its magnetic reader/read head 150.

It should be appreciated that where software/firmware is described in a particular form (such as a component or module) this is merely to aid understanding and is not intended to limit how software/firmware that implements those functions may be architected or structured. For example, modules are illustrated as separate modules, but may be implemented as homogenous code, as individual components, some, but not all of these modules may be combined, or the functions may be implemented in software/firmware structured in any other convenient manner.

Furthermore, although the software/firmware modules are illustrated as executing on one piece of hardware, the software/firmware may be distributed over multiple processors or in any other convenient manner. The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:
1. A method, comprising:
    activating an electromagnetic noise signal within a card reader in response to detecting a presence of a card;
    maintaining the electromagnetic noise signal until the card is detected by sensors as exiting a card slot of the card reader;
    preventing a magnetic card reader from reading card data for the card off a magnetic strip of the card through the maintaining of the electromagnetic noise signal;

preventing any skimmer present within the card reader from reading the magnetic strip through the maintaining of the electromagnetic noise signal; and forcing a chip reader to read the card data off an embedded chip of the card through the maintaining of the electromagnetic noise signal, wherein the electromagnetic noise signal is produced by a pulsating coil that is either in contact with or adjacent to a magnetic read head, and wherein the pulsating coil creates electromagnetic interference preventing both the magnetic read head and any skimmer from reading the magnetic strip;

wherein the electromagnetic noise signal is maintained for an entire duration in which the card is within the card slot and the card reader;

wherein the electromagnetic noise signal is continuously maintained as long as the card reader is receiving power, regardless of whether a card is present, such that the magnetic card reader is rendered inoperative to read magnetic stripe data at all times when the card reader is powered on, thereby forcing all card data reading to occur via the chip reader.

2. The method of claim 1, wherein the electromagnetic noise signal is produced by a pulsating coil that is either in contact with or adjacent to the magnetic read head.

3. The method of claim 1, wherein the sensors detect the presence of the card proximate to the card slot, in the card slot, or in the card reader.

4. The method of claim 1, wherein the electromagnetic noise signal is activated when the card reader is powered on.

5. The method of claim 1, wherein the electromagnetic noise signal is maintained by an electromagnetic noise generator located within the card reader adjacent to the magnetic card reader or behind a bezel associated with the card slot.

6. The method of claim 1, wherein the electromagnetic noise signal is activated based on the presence of the card being detected by at least one sensor of the card reader indicating the card is proximate to the card slot, in the card slot, or in the card reader.

7. The method of claim 1, wherein a pulsating coil is caused to pulsate adjacent to or contacting the magnetic card reader.

8. The method of claim 1, wherein at least one sensor determines that the card is no longer adjacent to nor within the card slot and causes the electromagnetic noise signal to stop within the card reader.

9. The method of claim 1, wherein an electromagnetic noise generator is situated adjacent to a magnetic reader or behind a bezel of the card slot.

10. The method of claim 1, wherein the card reader is part of a terminal selected from a group consisting of an automated teller machine (ATM), a self-service terminal (SST), a point-of-sale (POS) terminal, a fuel kiosk, a reservation kiosk, an entertainment kiosk, a travel kiosk, and an informational kiosk.

11. The method of claim 1, wherein at least one sensor is a motion sensor that detects motion adjacent to an entry point of the card slot.

12. The method of claim 1, wherein the card reader is a motorized card reader.

13. A method comprising:

detecting a presence of a card adjacent to or within a card slot of a card reader;

activating an electromagnetic noise signal in response to the detecting;

preventing by the electromagnetic noise signal a magnetic read head of the card reader and any skimmer present in the card reader from reading a magnetic strip of the card as long as the card remains within the card reader; and forcing the card reader to use a chip reader to read card data from the card off of an embedded chip in the card;

wherein the electromagnetic noise signal creates electromagnetic interference preventing both the magnetic read head and any skimmer from reading the magnetic strip for an entire duration in which the card is within the card slot and the card reader wherein the electromagnetic noise signal is produced by a pulsating coil that is either in contact with or adjacent to the magnetic read head, and wherein the pulsating coil creates electromagnetic interference preventing both the magnetic read head and any skimmer from reading the magnetic strip;

wherein the electromagnetic noise signal is continuously maintained as long as the card reader is receiving power, regardless of whether a card is present, such that the magnetic read head is rendered inoperative to read magnetic stripe data at all times when the card reader is powered on, thereby forcing all card data reading to occur via the chip reader.

14. The method of claim 13, wherein the electromagnetic noise signal is activated and maintained as long as the card reader is powered on and while the card is adjacent to or within the card slot.

15. The method of claim 13, wherein the electromagnetic noise signal is activated based on at least one sensor detecting a presence of the card proximate to the card slot of the card reader, within the card slot of the card reader, or within the card reader.

16. The method of claim 13, wherein the electromagnetic noise signal is produced by an electromagnetic noise generator located within the card reader adjacent to the magnetic read head or within the card reader behind a bezel of the card slot.

17. The method of claim 13, wherein the electromagnetic noise signal is produced by pulsating a coil.

18. The method of claim 13, wherein the card reader is part of a terminal that is an automated teller machine (ATM).

19. A system comprising:

a terminal;

an electromagnetic noise generator; and a card reader that comprises:

a magnetic card reader;

a chip card reader;

sensors;

a processor; and a non-transitory computer-readable storage medium that comprises executable instructions for firmware;

wherein the firmware when executed by the processor from the non-transitory computer-readable storage medium causes the processor to perform operations comprising:

detecting a presence of a card using at least one sensor of a plurality of sensors;

activating the electromagnetic noise generator within the card reader in response to detecting the presence of the card; and maintaining an electromagnetic noise signal until the sensors detect the card exiting a card slot of the card reader;

wherein the electromagnetic noise generator generates an electromagnetic noise signal within the card reader preventing the magnetic card reader from reading card data off the card, and forcing the chip card reader to read the card data of an embedded chip of the card, and preventing any skimmer present in the card reader from reading the card data off a magnetic strip of the card;

wherein the electromagnetic noise signal is maintained for an entire duration in which the card is within the card slot and the card reader to create electromagnetic interference that prevents both the magnetic card reader and any skimmer from reading the magnetic strip;

wherein the electromagnetic noise signal is continuously maintained as long as the card reader is receiving power, regardless of whether a card is present, such that the magnetic card reader is rendered inoperative to read magnetic stripe data at all times when the card reader is powered on, thereby forcing all card data reading to occur via the chip card reader;

wherein the electromagnetic noise generator is a pulsating coil that is either in contact with or adjacent to the magnetic card reader, and wherein the pulsating coil creates electromagnetic interference preventing both the magnetic card reader and any skimmer from reading the magnetic strip.

20. The system of claim 19, wherein the terminal includes the electromagnetic noise generator and the electromagnetic noise generator is a device that pulsates a coil.

\*   \*   \*   \*   \*